United States Patent
Palum et al.

(10) Patent No.: US 7,656,441 B2
(45) Date of Patent: Feb. 2, 2010

(54) HUE CORRECTION FOR ELECTRONIC IMAGERS

(75) Inventors: Russell J. Palum, Rochester, NY (US); Bruce H. Pillman, Rochester, NY (US); John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 830 days.

(21) Appl. No.: 11/029,434

(22) Filed: Jan. 5, 2005

(65) Prior Publication Data

US 2006/0146149 A1     Jul. 6, 2006

(51) Int. Cl.
*H04N 5/217* (2006.01)
*H04N 9/64* (2006.01)
*G06K 9/00* (2006.01)
*G06K 9/40* (2006.01)

(52) U.S. Cl. .................. 348/241; 348/248; 382/167; 382/275

(58) Field of Classification Search .......... 382/162, 382/164, 167, 274, 275; 348/230.1, 241, 348/248, 249, 255
See application file for complete search history.

(56) References Cited

U.S. PATENT DOCUMENTS

| | | | |
|---|---|---|---|
| 7,065,248 B2 * | 6/2006 | Lee et al. ................ 382/275 |
| 7,239,758 B2 * | 7/2007 | Tsuda ...................... 382/275 |
| 7,450,161 B1 * | 11/2008 | Feng et al. ............... 348/224.1 |
| 7,561,194 B1 * | 7/2009 | Luo ........................ 348/241 |
| 2003/0006363 A1 * | 1/2003 | Campbell et al. ........ 250/208.1 |
| 2003/0021474 A1 * | 1/2003 | Hunter et al. ............ 382/167 |
| 2003/0234879 A1 | 12/2003 | Whitman et al. |
| 2004/0246352 A1 * | 12/2004 | Suzuki ..................... 348/272 |
| 2005/0041116 A1 * | 2/2005 | Tsukioka ................. 348/229.1 |

* cited by examiner

*Primary Examiner*—Sinh Tran
*Assistant Examiner*—Albert H Cutler
(74) *Attorney, Agent, or Firm*—Raymond L Owens

(57) ABSTRACT

A method for correcting for hue artifacts captured by an imager associated with a color filter array including first, second and third color pixels and optical system spaced from the imager, wherein a first group of second pixels are primarily influenced by adjacent first pixels and a second group of second pixels are primarily influenced by adjacent third pixels, includes separately blurring or smoothing the first and third pixels and the first and second group of second pixels; based on the difference between adjacent pixels of the first and second group of second pixels, correcting for hue in the second group of second pixels; and correcting for adjacent third pixels based on the correction for adjacent second group second pixels.

2 Claims, 6 Drawing Sheets

| GoR | R | GoR | R |
| --- | --- | --- | --- |
| B | GoB | B | GoB |
| GoR | R | GoR | R |
| B | GoB | B | GoB |

| YoM | M | YoM | M |
| --- | --- | --- | --- |
| C | YoC | C | YoC |
| YoM | M | YoM | M |
| C | YoC | C | YoC |

FIG. 7

| G | R | G | R |
| --- | --- | --- | --- |
| B | C | B | C |
| G | R | G | R |
| B | C | B | C |

FIG. 8

HUE CORRECTION FOR ELECTRONIC IMAGERS

FIELD OF THE INVENTION

The invention relates generally to the field of digital image processing, and in particular to the correction of color shifts that occur when light rays strike an electronic imager with varying incident angles.

BACKGROUND OF THE INVENTION

Uniformity variations and hue shifts attributable to the combined effects of the imager and lens have been corrected in cameras manufactured by Eastman Kodak Company, Rochester, N.Y., as early as 1991. In these cameras, uniformity and hue correction are implemented as arrays of gain values to be applied to the image data. In this document, arrays are two-dimensional and are in some ways treated as an image. There is exact correspondence between rows and columns in an image and the rows and columns in an array. Similarly, a map is a two-dimensional array of values with exact correspondence between the rows and columns of the map and the rows and columns of the image. The map contains numerically encoded logical information about the pixels in the corresponding image. For example the value in a map might be set to zero if the pixel with the corresponding row and column is less than a first threshold, the value might be set to one if the pixel with the corresponding row and column is within a range of values, and it could be set to two if the pixel with the corresponding row and column is above a second threshold.

Electronic cameras (and scanners) have incorporated gain uniformity correction for many years. These gain corrections have usually been calibrated with a specific lens. In the case of a camera with interchangeable lenses, not all lenses have the exit pupil at the same location. As shown in FIG. 1, the exit pupil location can affect the uniformity of response for an electronic imager. Notice the ray angles get steeper at image locations further off axis. In the case of a monochrome imager, this could not affect the color of the response. In the case of an imager with a color filter array (CFA), adjacent pixels are typically different colors, such as shown in the Bayer pattern of FIG. 2. In the CFA pattern shown, pixels marked R are sensitive to red light, pixels marked B are sensitive to blue light, and pixels marked GoR or GoB are sensitive to green light. Because each pixel has neighbors of a different color, cross talk between pixels introduces hue shifts. FIG. 3 shows a closer view of light rays striking an imager with a CFA at varying incident angles. The pixel on the optical axis has very little potential for cross talk but the cross talk is much higher at the edge pixels because the light passes through the CFA for one color pixel and falls, at least partially, on a photo site for the next pixel. This effect increases from center to edge and leads to a hue shift from center to edge. The effect is lens, aperture, and zoom setting dependent because the ray angles change depending on exit pupil size and position. If the exit pupil is closer to the imager, the light rays approach from a wider range of angles; if the exit pupil is farther from the imager, the range of angles is narrower.

Digital cameras sold by the Eastman Kodak Company use a hue correction method where the gain required to correct each pixel to provide equal sensitivity and consistent hue is calculated and stored in an array. The values in the arrays tend to change slowly and smoothly. For efficiency, the arrays are paxelized and then the required value for each pixel is interpolated from the reduced size array. An image or array is paxelized by creating a smaller image or array that is the result of an average of every "N" values vertically and "M" values horizontally where "N" and "M" are integer numbers of pixels. Typically N and M are equal but they do not have to be equal.

The gain correction arrays in Kodak cameras are developed with a well-chosen lens, and are effective for all but a few pathological lenses. The electronic imagers in earlier Kodak cameras covered only a portion of the lens field so different lenses did not introduce, significantly different effects because the range of ray angles in the reduced field image is also reduced. With the introduction of an imager covering the full field of a 35 mm SLR lens (24 mm by 36 mm), the effects due to lens variation became significant so an additional adjustment of the correction became necessary for these cameras. Cameras with smaller imagers will also have hue shift that varies significantly if they have lenses with a large variation in exit pupil location, especially with exit pupils near the imager.

One instance of prior art in the patent literature is United States Published Patent Application US 2003/0234879 A1, "Method and Apparatus for Color Non-uniformity Correction in a Digital Camera," C. A. Whitman et al, assigned to Hewlett Packard Company, published Dec. 25, 2003.

The method described by Whitman et al, stores multiple gain correction arrays. Each array accurately applies only for a specific lens condition (focal length and aperture). They teach a method of storing arrays for different conditions, and interpolating between arrays for intermediate conditions. This method requires detailed characterization of a specific lens.

SUMMARY OF THE INVENTION

It is an object of the present invention to provide an effective way to correct hue artifacts captured by an imager with a color filter array. The invention adaptively corrects hue shifts that occur when light rays strike an electronic imager having a color filter array (CFA) with varying incident angles.

This object is achieved by a method for correcting for hue artifacts captured by an imager associated with a color filter array including first, second and third color pixels and optical system spaced from the imager, wherein a first group of second pixels are primarily influenced by adjacent first pixels and a second group of second pixels are primarily influenced by adjacent third pixels, comprising:

(a) separately blurring or smoothing the first and third pixels and the first and second group of second pixels;

(b) based on the difference between adjacent pixels of the first and second group of second pixels, correcting for hue in the second group of second pixels; and (c) correcting for adjacent third pixels based on the correction for adjacent second group second pixels.

In this description, the term "difference" can mean any variation between pixels, not just subtraction. For example a ratio of pixels in different color planes being not equal to one is a difference between the pixels.

An advantage of the present invention is the ability to correct hue shifts arising from a wide range of lenses, especially without requiring detailed characterization of each lens.

BRIEF DESCRIPTION OF THE DRAWINGS

FIG. 7 depicts a prior art color filter array pattern than can also be used with the present invention; and FIG. 8 depicts a third color filter array pattern that can be used with the present invention.

DETAILED DESCRIPTION OF THE INVENTION

Figures 1, 2:
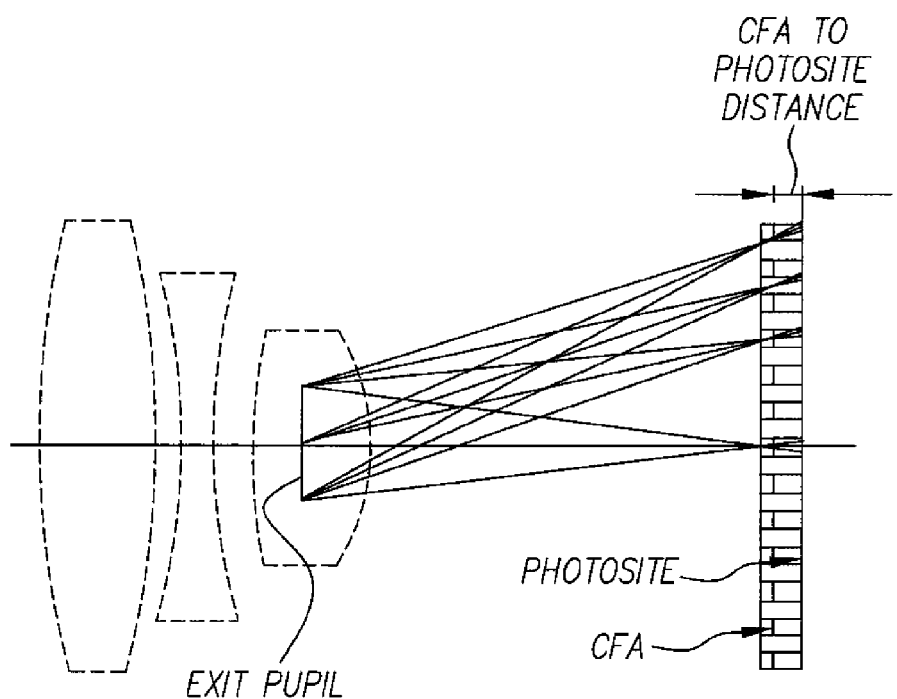
FIG. 1 is a prior art schematic showing how the exit pupil of a lens can affect the response of an electronic imager by affecting the angle of rays striking the imager.
FIG. 2 depicts a prior art Bayer pattern for red, green and blue pixels in a color filter array used in accordance with the present invention.
Figure 3:
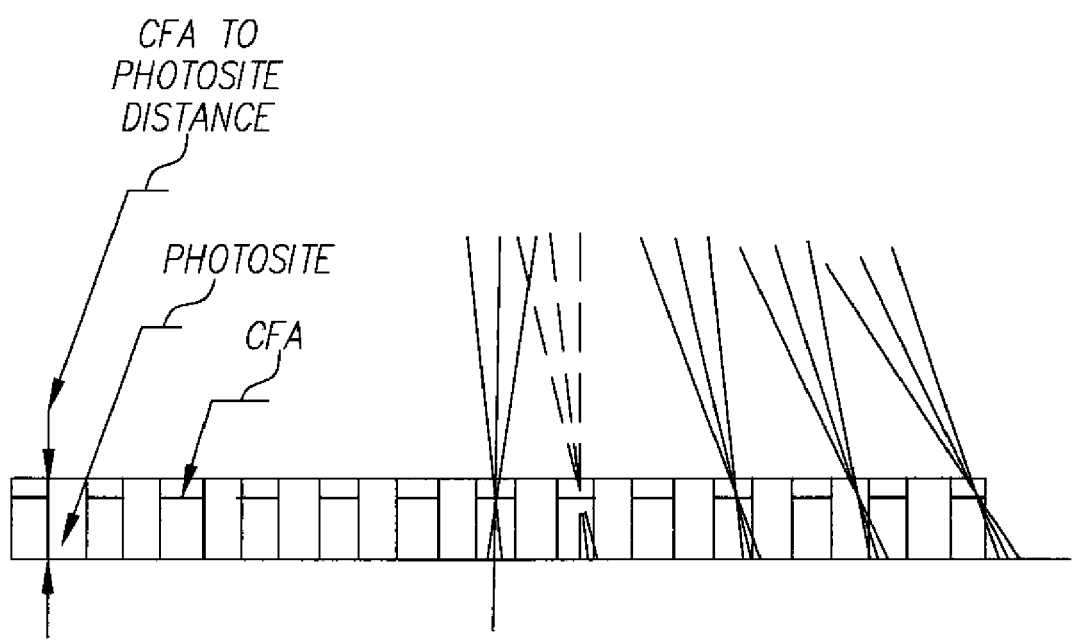
FIG. 3 is a schematic showing how the ray angles can affect cross-talk between pixels.

The following describes a way to correct for hue artifacts captured by an imager with a CFA including red, green and blue color pixels (See FIG. 1).

Figure 4:
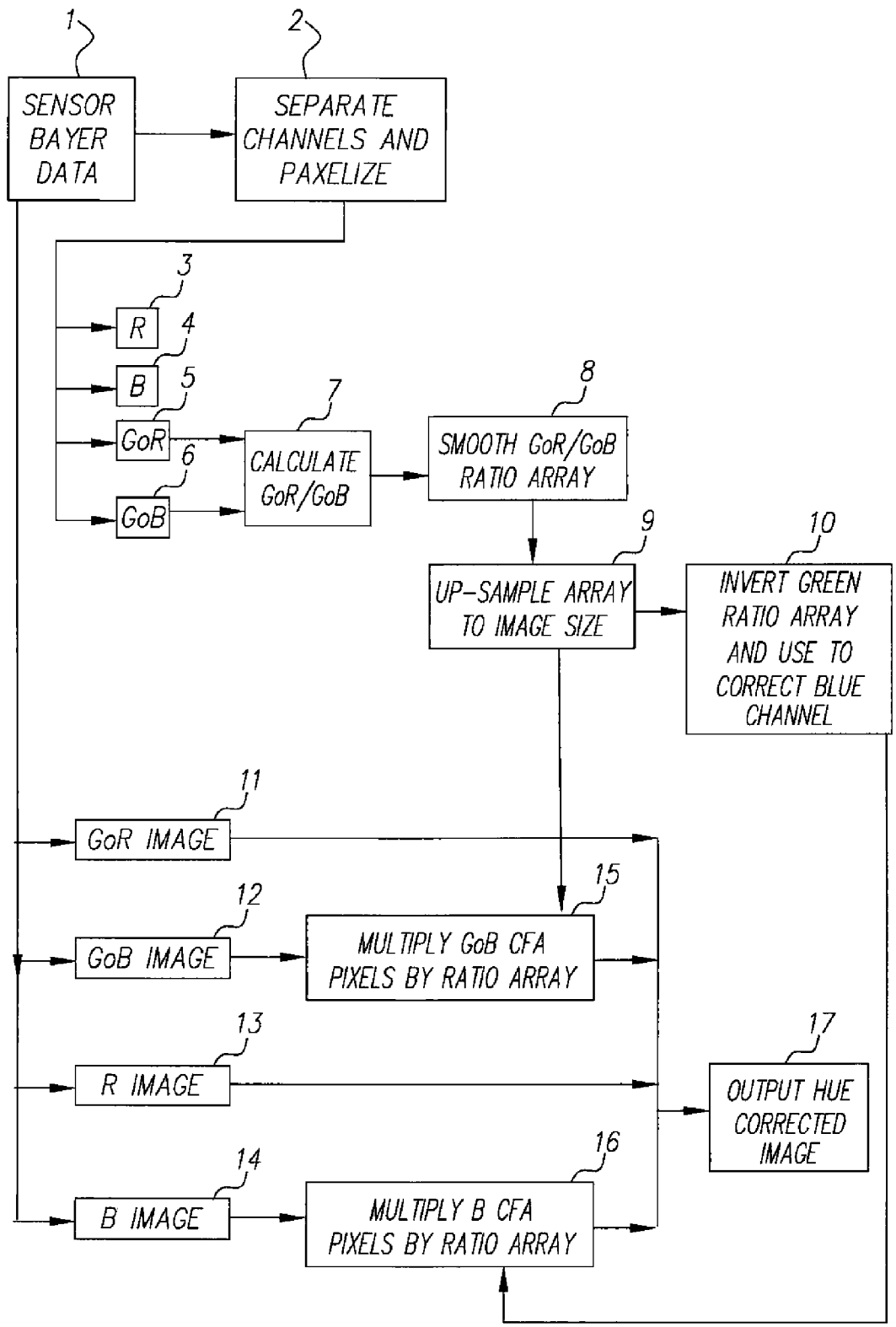
FIG. 4 is a flow diagram showing how the correction array is determined for the GoB pixels in the Bayer pattern and how this array can be inverted to correct the B channel.

One preferred embodiment is tailored for an imager with a well known Bayer pattern color filter array. The CFA image, FIG. 4 block 1, is first split into four channels and paxelized as shown in FIG. 4 block 2. The four channels are: red (R), green pixels on red rows (GoR), green pixels on blue rows (GoB), and blue pixels (B), as shown in FIG. 4 blocks 3,4,5 and 6. The channels are separated by only using pixels of the same channel to contribute to each paxelized array. The paxelized arrays are much smaller than the full resolution image, for example by a factor of 64 to 1024. These paxelized arrays process faster because they are smaller.

In this embodiment, the GoR channel is selected because it is the channel least affected by crosstalk, and other channels are corrected to be consistent with GoR channel. The GoR channel can be considered as a first group of green pixels. The crosstalk out of the GoB channel (a second group of green pixels) is assumed to show up in the B channel so the GoB correction is inverted and applied to the blue channel.

In calculating the ratio of the GoR and GoB arrays, paxels are excluded from the calculation that have ratios that are either too high or low. The ratio of the excluded paxels can be replaced with 1.0 or the ratio of the surrounding good paxels. This exclusion avoids having the ratio image affected by clipped pixels and pixels where there is so little signal the ratio is ill conditioned or zero in the denominator. Gains are then calculated, as shown in FIG. 4 block 7, on a per paxel basis from the GoR/GoB ratio. The result is the gain required to make GoB, on average, equal to GoR.

As shown in FIG. 4 block 8, the calculated gains are determined at low resolution and blurred or smoothed, so high frequency differences between the two green channels are not affected. Because the GoR channel is used as the reference other channels are corrected to match. The GoR channel is not modified. The GoB channel is multiplied by the up-sampled correction array as shown in FIG. 4 block 9 thereby connecting GoB channel values. The result is a hue correction in the second group of green pixels. Block 9 indicates the array is up-sampled to the full image size before applying it to the GoB image. In practice the array can be up-sampled one pixel at a time to avoid using large amounts of memory. The up sampling can use nearest neighbor, bilinear, or other interpolation methods known in image processing.

FIG. 4 block 10 shows the green channel correction array is inverted (each gain value is replaced by its reciprocal) and the inverted array is applied to the B channel thereby correcting blue pixels. Blocks 11, 12, 13 and 14 refer to individual channels of the full resolution CFA image. As shown in blocks 15 and 16, the GoB and B channels are corrected by the appropriate gain arrays, while the GoR and R channels are uncorrected. Block 17 refers to re-assembly of the color channels into a single corrected CFA image. This is illustrated to make the flow of calculation more clear. It may also be more effective to pass the original Bayer data, FIG. 4 block 1, to the gain correction, and modify the appropriate pixels with the correction gains. This buffer management produces the same corrected image, but requires less buffer space. In some cases this is the only correction needed to correct an image with hue artifacts.

Figure 5:
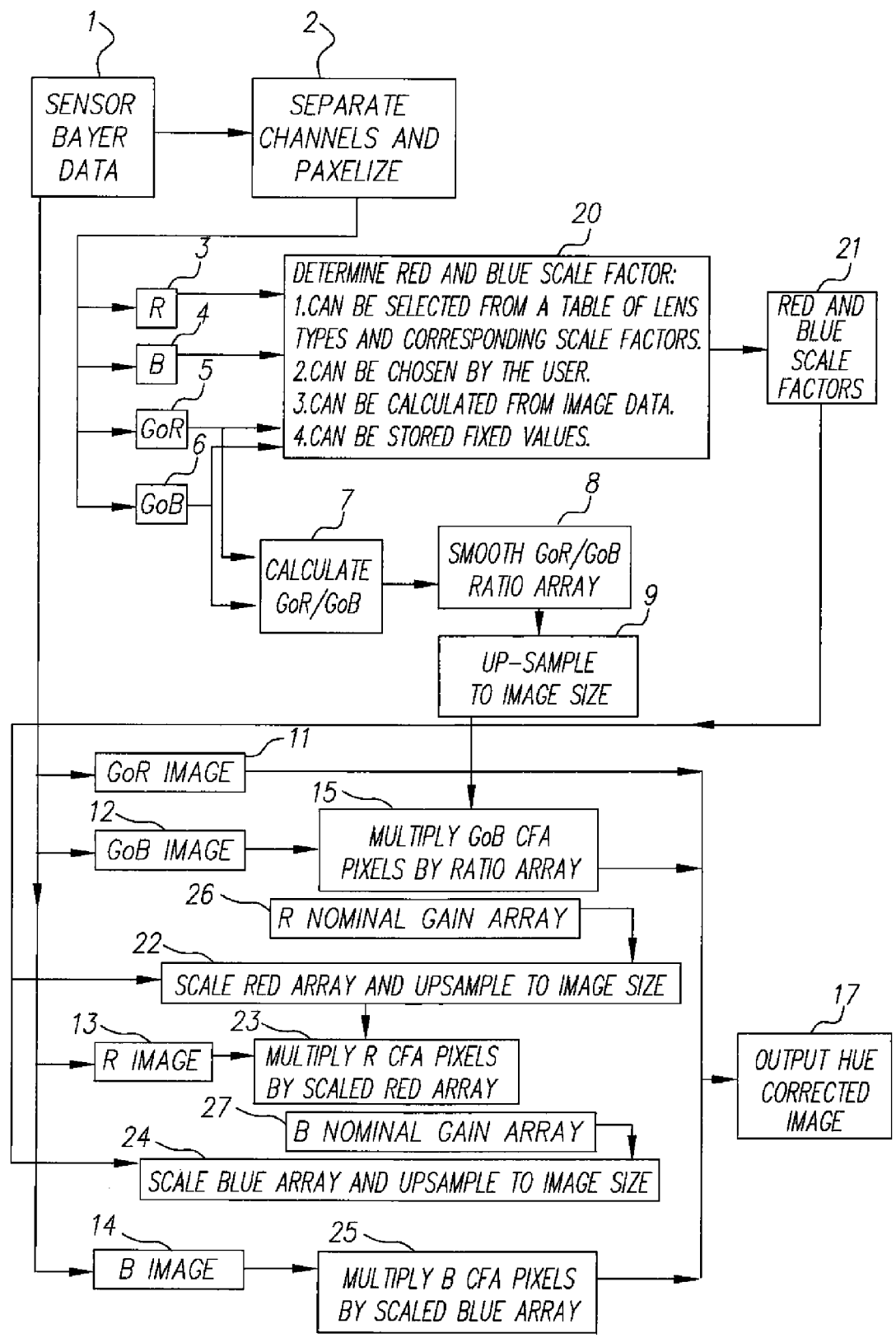
FIG. 5 is a flow diagram showing how nominal correction arrays are scaled and applied to correct hue in an image.

A second preferred embodiment is tailored for an imager with a Bayer pattern CFA (See FIG. 2). The CFA image, FIG. 5 block 1, is first split into four channels and paxelized as shown in FIG. 5 block 2. The four channels are: red (R), green pixels on red rows (GoR), green pixels on blue rows (GoB), and blue pixels (B), as shown in FIG. 5 blocks 3, 4, 5 and 6. The channels are separated by only using pixels of the same channel to contribute to each paxelized array. The paxelized arrays are much smaller than the full resolution image, perhaps by a factor of 64 to 1024. These paxelized arrays process faster because they are smaller.

In this embodiment, the GoR channel is selected as being the channel least affected by crosstalk, and other channels are corrected to be consistent with GoR channel. It should be noted that Blocks 1-15 are identical in both FIGS. 4 and 5 and so their description need not be repeated.

In the second preferred embodiment, hue is corrected for adjacent red and blue pixels based on stored previously calculated data for each red, green and blue pixels. More specifically, the red and blue channels are corrected with scaled gain arrays based on nominal gain corrections as shown in FIG. 5 blocks 26 and 27. These previously calculated data or nominal gain corrections will typically have unit gains near the center of the image, and values greater or less than unity going towards the edge of the image. The gain values typically can be stored as scaled and offset integers, for example with the integer 4096 representing unit gain. The nominal gain arrays can be calculated from a model of the system or by previous measurement of images of gray cards or other uniform fields. A scale value determined from one of a variety of sources is used to scale the gain array; the scaled array is then stored for application later in the image processing chain. In this embodiment the scale values can come from a user selection, from a database of stored scale values, from an analysis of the paxelized image data, or kept fixed at a stored value. In some cases the scale value does not need to change depending on the lens, because the red or blue channel may need a relatively constant correction. These options are itemized in FIG. 5 block 20. The database of stored scale values can be organized by lens data, so a user can have the camera automatically choose a scale value based on the lens used for a given image or the user can manually input the scale value.

Regardless of the source of the scaling factors, the output from block 20 in FIG. 5 is a pair of scale factors, shown in block 21. The red scale factor is used to scale the red nominal gain array, block 26. The scaling of the nominal gain array is based on the equation:

$$G_{scaled} = (G_{nom} - \text{unity}) \times \text{scale} + \text{unity}$$

In this equation, unity refers to the integer value corresponding to unit gain, scale refers to the desired scaling factor, $G_{nom}$ refers to the nominal gain value, and $G_{scaled}$ refers to the output scaled gain. FIG. 5 block 22 shows this scaling operation being combined with an up sampling step. The up sampling step is similar to the one done in block 9, and can also be done as a separate processing step.

The blue scale factor is used to scale the blue nominal gain array, block 27. The scaling and up sampling operation, block 24, is identical block 22, the operation on the red channel.

In FIG. 5, blocks 11, 12, 13 and 14 refer to individual channels of the full resolution CFA image. Blocks 15, 23, and 24 show the individual channels being corrected with the corresponding gain arrays. The GoR channel is not modified. These adjustments of the red and blue channels result in hue correction for those pixels. Block 17 refers to re-assembly of the color channels into a single corrected CFA image. This is illustrated to make the flow of calculation more clear. It can be effective to pass the original Bayer data, FIG. 5 block 1, to the gain correction and modify the appropriate pixels with the correction gains. This buffer management produces the same corrected image, but requires less buffer space.

Figure 6:
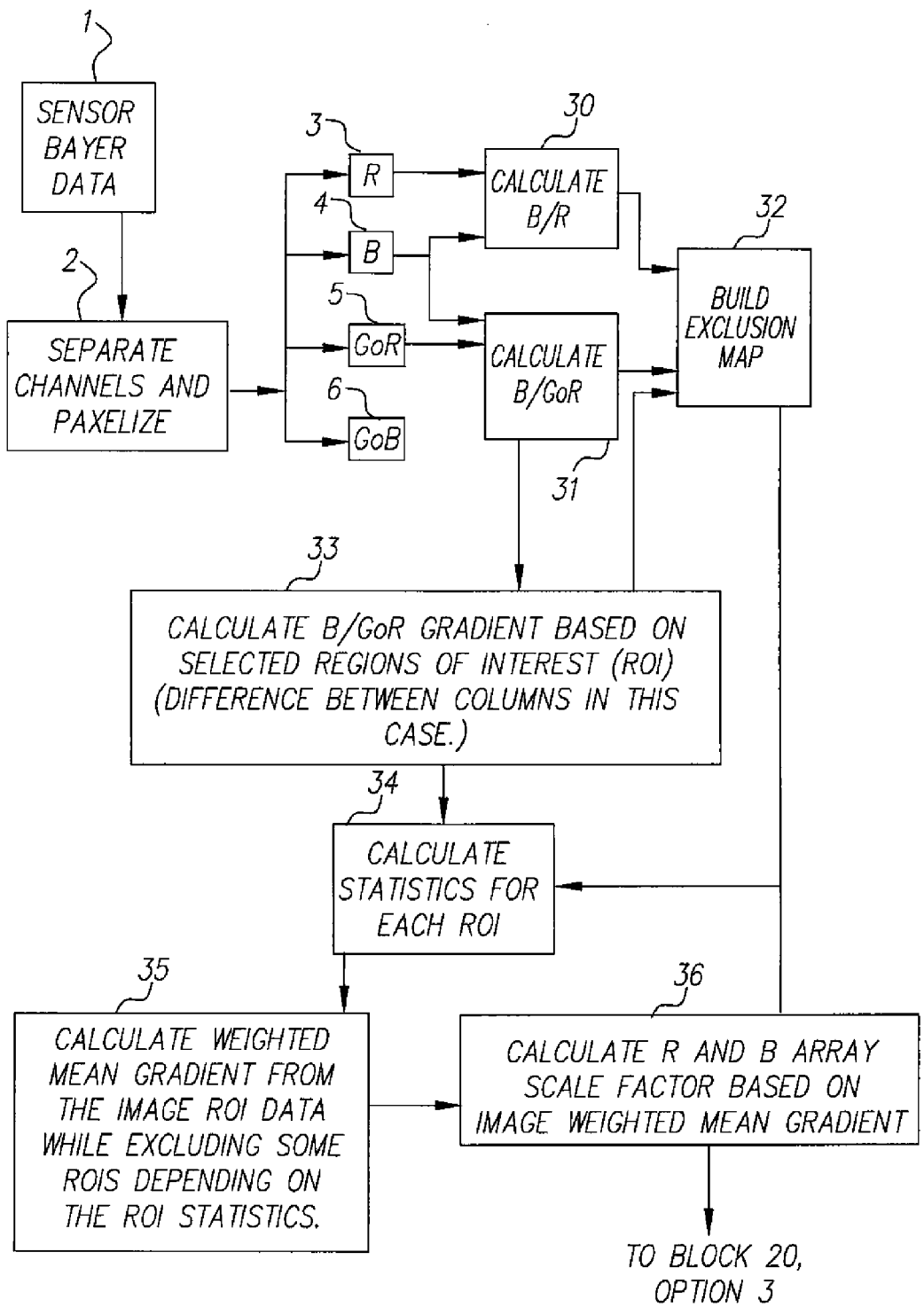
FIG. 6 is a flow diagram showing how the required array scaling factors can be calculated from image data.

As noted in block 20, a scale value can be estimated from image data. A preferred embodiment for this estimation is shown in FIG. 6. The first step is in this analysis is to take the paxelized images, blocks 3, 4, 5 and 6, and calculate two ratio arrays, a blue/red ratio, block 30, and a blue/GoR ratio, block 31. In calculating these ratios, paxels with very low values and very high values are excluded as is done when calculating the GoR/GoB ratio array. Further, a horizontal gradient in the blue/GOR array is calculated, as shown in FIG. 6 block 33. The horizontal gradient is used because the primary hue shift is horizontal (across the long dimension of the imager). These three arrays (blue/red ratio, blue/GoR ratio, blue/GoR gradient) are used to calculate an exclusion map, FIG. 6 block 32. The purpose of this map is to mark paxels that are very colored (low ratio or high ratio) or have edge information (have a gradient value with large magnitude).

Statistics are then calculated for multiple regions of interest (ROI) in the gradient array, excluding data from paxels marked for exclusion, as shown in FIG. 6 block 34. The ROIs can have varying size, but would typically include at least a dozen paxels. One preferred set of ROIs are vertical columns broken into equal thirds because the hue shift is largest on the horizontal axis for this imager. Multiple ROIs are used to effectively seek out relatively neutral, relatively flat regions in the image, so the gradient in the selected ROIs provides information on hue shift rather than scene content. The number of ROIs used can also vary. More ROIs require more processing, but provide a more robust estimate of the gradient in more difficult scenes.

The statistics calculated in block 34 for each ROI include a weighted mean, the number of pixels in the ROI, the percent of included pixels (those not marked for exclusion), the range of included values, and a scaled weighted mean. The scaled weighted mean is the weighted mean, scaled by a factor based on the location of the ROI. For example, the gradient on the left side of the image is generally opposite in sign to the gradient of the image on the right side of the image. Further, the gradient in the center of the image has lower magnitude than near the ends of the imager, and the gradient can again lessen in magnitude near the ends of the imager. Scaling the mean gradient for each ROI based on the expected gradient at the ROI location normalizes the contribution of each ROI. In other words, this technique makes the gradient estimate equal regardless of the location of an ROI.

Because the gradient array can also be affected by the color of the scene at a particular ROI, the gradient scaling can also depend on the value of the blue/red ratio and the blue/GoR ratio array location corresponding to the ROI.

Because the exclusion map can force many pixels in an ROI to be excluded, the percent of pixels included in each ROI provides an indication of gradient data reliability in that ROI. In addition, the range of gradient data in each ROI provides another indication gradient data reliability in that ROI. These two indicators are used to calculate a weighting factor for each ROI, as shown in FIG. 6, block 36. The scaled gradient estimates from ROIs with less reliability are weighted less, possibly with zero weighting.

After the estimation of statistics and ROI weighting factors for each ROI, a final weighted mean of all the ROI gradient values is calculated, weighting the scaled gradient value from each ROI with its weighting factor. The sum of the ROI weighting factors provides an indication of the total reliability of the final mean gradient. A high weighting factor sum indicates a relatively reliable estimate (such as would be found in an image of a uniform neutral field). A low weighting factor sum indicates a less reliable gradient estimate When the weighting factor sum gets low, the final combined mean can be adjusted to be more conservative to reduce the risk of poor hue correction.

The final step in the automatic scale estimation process is to convert the combined mean gradient into a scale value. The relationship between gradient and appropriate scale value can be linear or nonlinear. The final scale value calculation can also be multivariate, including variables such as lens aperture, and lens focal length.

This invention was described using the Bayer color filter array pattern as an example. Other color filter array patterns can also be handled by this invention. For a second example, a Bayer-like pattern with complementary (MYC) colors is shown in FIG. 7. In this pattern, YoM and YoC pixels are both sensitive to yellow (red plus green) light, M pixels are sensitive to magenta (red plus blue) light, and C pixels are sensitive to cyan (green plus blue) light. This pattern can be handled just like the RGB Bayer pattern by substituting YoM for GoR, YoC for GoB, M for R, and C for B. In other words, magenta, yellow and cyan are substituted for red, green, and blue, respectively, wherever red, green, and blue appear.

This invention can also be adapted to other color filter arrays, such as the one shown in FIG. 8. In this pattern, there is no pair of channels to correct as the Gor and GoB channels in the Bayer pattern. Instead, nominal hue correction data can be stored for three or all four of the channels. The nominal hue correction surfaces can be scaled as needed for hue correction, as was described for the red and blue channels for the Bayer color filter array.

The invention has been described in detail with particular reference to certain preferred embodiments thereof, but it will be understood that variations and modifications can be effected within the spirit and scope of the invention.

PARTS LIST

1 Array (image) of data from imager with Bayer color filter array
2 Processing block to separate color channels and paxelize them
3 Array of red channel data
4 Array of blue channel data
5 Array of GoR (green on red row) data
6 Array of GoB (green on blue row) data
7 Processing block for calculating ratio of GoR/GoB
8 Processing block for smoothing ratio array
9 Processing block for up sampling gain array
10 Processing block for inverting ratio array
11 GoR pixels in full image
12 GoB pixels in full image
13 Red pixels in full image 14 Blue pixels in full image
15 Processing block for applying gain correction to GoB pixels
16 Processing block for applying gain correction to Blue pixels
17 Output block for corrected image
20 block for selection of scale factors
21 Block of red and blue scale factors
22 block for scaling and up sampling red gain array
23 block for applying gain correction to red pixels
24 block scaling and up sampling blue gain array
25 block for applying gain correction to blue pixels
26 nominal gain correction array for red channel
27 nominal gain correction array for blue channel
30 block for calculation of blue/red ratio
31 block for calculation of blue/GoR ratio
32 block for building exclusion map
33 block for calculation of gradient in blue/GoR array
34 block for calculation of ROI statistics
35 block for calculation of global gradient estimate
36 block for calculation of red and blue scale factors from global gradient estimate

The invention claimed is:

1. A method for correcting for hue shift artifacts captured by an imager associated with a color filter array including red, green and blue color pixels and optical system spaced from the imager, wherein a first group of green pixels are primarily influenced by adjacent red pixels and a second group of green pixels are primarily influenced by adjacent blue pixels, comprising:

(a) separately blurring or smoothing the first and second group of green pixels;

(b) based on the difference between adjacent pixels of the first and second group of blurred or smoothed green pixels, correcting for hue shift artifacts in the second group of unblurred green pixels by using gain correction based on such difference; and (c) correcting for hue shift artifacts in adjacent blue pixels based on the gain correction for adjacent second group green pixels wherein the hue shift artifact correction for blue pixels includes using the inverse of the correction for the second group of green pixels.

2. The method of claim 1 further including providing a nominal gain correction for each red and blue pixel and adjusting such nominal gain correction based on the captured red pixels, first and second group of green pixels and blue pixels.

* * * * *